United States Patent [19]

Hartmann

[11] 4,156,068
[45] May 22, 1979

[54] HIGH MOLECULAR WEIGHT POLYETHERSULFONES

[75] Inventor: Ludwig A. Hartmann, Wilmington, Del.

[73] Assignee: ICI Americas Inc., Wilmington, Del.

[21] Appl. No.: 906,788

[22] Filed: May 17, 1978

Related U.S. Application Data

[63] Continuation of Ser. No. 651,180, Jan. 26, 1976, abandoned, which is a continuation-in-part of Ser. No. 602,486, Aug. 5, 1975, abandoned.

[51] Int. Cl.$^2$ ............................................. C08G 75/23
[52] U.S. Cl. .................................................... 528/175
[58] Field of Search ............................ 260/49; 528/175

[56] References Cited

U.S. PATENT DOCUMENTS 4,009,149  2/1977  King et al. ............................ 260/49

FOREIGN PATENT DOCUMENTS 1396433  5/1970  United Kingdom.
1264900  2/1972  United Kingdom.

OTHER PUBLICATIONS

ACS Publication: Advances in Chemistry, Series 91, pp. 692 to 702 (1969), Schulze et al.
ACS Polymer Preprints 16, pp. 476 to 481 (1975), Robeson et al.
New Linear Polymers, Lee et al., pp. 101 to 127 (1967).

*Primary Examiner*—V. P. Hoke
*Attorney, Agent, or Firm*—H. Jolyon Lammers

[57] ABSTRACT

High molecular weight polyether-sulfones are prepared by reacting a 3,3′,5,5′-tetraalkyl-4,4′-dihydroxybiphenyl with 4,4′-dihalodiphenyl sulfone and from about 0 to 30 percent stoichiometric excess of an alkali metal carbonate or bicarbonate compound in the presence of a dipolar aprotic solvent. The polyethersulfone polymers and products made therefrom possess low density and high glass transition temperatures while maintaining good solvent resistance and good tensile, flexural, and hardness properties.

22 Claims, No Drawings

HIGH MOLECULAR WEIGHT POLYETHERSULFONES

This application is a continuation of an application having Ser. No. 651,180 filed Jan. 26, 1976, now abandoned which is a continuation-in-part of an application having Ser. No. 602,486 filed Aug. 5, 1975, now abandoned.

This invention relates to a novel method for preparing improved polyethersulfones.

Polyethersulfones are important and useful polymers in the manufacture of films, sheets and molded parts. Such polymers are normally prepared by reacting an alkali metal salt of a dihydric phenol with a 4,4'-dihalodiphenyl sulfone compound. The alkali metal salt is usually obtained by reacting a strong base, such as potassium or sodium hydroxide with a dihydric phenol. UK Pat. No. 1,078,234 describes the above method where the dihydric phenol may be Bisphenol A. It is also known from UK Pat. No. 1,264,900 to react a Bisphenol A or a blend of Bisphenol A and an unsubstituted biphenol with an equal molar amount of a 4,4'-dihalodiphenyl sulfone in the presence of potassium carbonate. This reference teaches that in order to obtain polymers of desirable molecular weight the molar amount of potassium carbonate employed should not be less than the combined amount on a molar basis of the dihydric phenol and 4,4'-dihalodiphenyl sulfone present. It is further known to polymerize the potassium diphenoxide salt of 3,3'5,5'-tetramethyl-4,4'-biphenol with 4,4'-dichlorodiphenyl sulfone—Schultze, *The Kinetics of Solution Polycondensation of Aromatic Polyethers.* Advances in Chemistry Series (ACS), 1969, Vol. 91, pages 692–702.

However, there is no disclosure in the prior art that polyether sulfones having controllable molecular weights ranging from within 20,000 to 125,000 may be prepared from 3,3',5,5'-tetraalkyl-4,4'-dihydroxybiphenyl using a stoichiometric excess of 0 to 30 percent of an alkali metal carbonate or bicarbonate, nor has there been any suggestion of polymeric polyethersulfones derived from 3,3',5,5'-tetraalkyl-4,4'-dihydroxybiphenyl and having a density of no more than 1.20 gm/cc.

It has now been discovered that when a 3,3'5,5'-tetraalkyl-4,4'-dihydroxybiphenyl is reacted with a substantially equal molar amount of a 4,4'-dihalodiphenyl sulfone compound and from about 0 to 30 percent of stoichiometric excess of an alkali metal carbonate or bicarbonate in the presence of a dipolar aprotic solvent, improved polymers are formed. Not only do the polymers exhibit excellent high heat distortion temperatures and other advantageous properties, but surprisingly the polymers or products made therefrom possess unusually low densities. Such lower densities provide obvious economic savings in the manufacture of films, sheets or molded parts.

According to the invention there is therefore provided a process for preparing a polyethersulfone polymer having a molecular weight from between 20,000 to 125,000 which comprises the substantially equimolar reaction of a 3,3',5,5'-tetraalkyl-4,4'-dihydroxybiphenyl with a 4,4'-dihalodiphenyl sulfone compound and from about 0–30 percent stoichiometric excess of an alkali metal carbonate or bicarbonate in the presence of a dipolar aprotic liquid solvent.

According to the invention there is also provided a polyethersulfone polymer derived from a 3,3',5,5'-tetraalkyl-4,4'-dihydroxybiphenyl having a molecular weight of from 20,000 to 125,000 and a density of no more than 1.20 gm/cc.

The reactants which may be utilized and which are critical to the present invention are described in detail below.

The 3,3',5,5'-tetraalkyl-4,4'-dihydroxybiphenyl which may be employed in carrying out the present invention has the following formula.

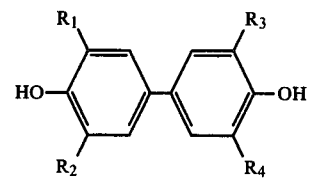

wherein $R_1$, $R_2$, $R_3$ and $R_4$ are alkyl and may be the same or different.

As used herein, the term alkyl refers to any monovalent radical derived from a saturated aliphatic hydrocarbon by removal of one hydrogen atom therefrom. The term includes both straight chain and branch chain materials containing from 1 to about 12 carbon atoms. Preferred results are achieved with the alkyl substituents containing from 1 to about 5 carbon atoms. In the compositions of the present invention it is preferred to employ symmetrical biphenyls—i.e. those in which the substituent $R_1$ equals $R_3$ and $R_2$ equals $R_4$. A specific starting compound which is most preferred is tetramethylbiphenol (TMBP), wherein the alkyl substituents are all methyl. Other biphenols which may be useful include those where the alkyl substituent may be ethyl, propyl and secondary butyl. By the term molecular weight is meant, unless otherwise specifically indicated, weight average molecular weight.

The tetraalkyl biphenols utilized in the process of the invention are commercially available or may be prepared according to the teaching of U.S. Pat. No. 3,804,865.

The halogen atoms in the dihalodiphenyl sulfone compound are preferably chlorine for economic reasons. The fluorine derivative is more expensive but will cause the formation of polymer to proceed at a faster rate. The bromine derivatives are more comparable to the chlorine derivatives but may require adjustment of reaction temperature. Iodine derivatives generally react slower.

The alkali metal carbonate or bicarbonate, is preferably potassium carbonate although other alkali metal carbonates such as sodium carbonate may also be useful. Similarly the bicarbonates such as potassium bicarbonate will also have utility in the process of the invention. It has been discovered that the amount of carbonate or bicarbonate is critical to the formation of the desired polymers. Specifically a stoichiometric excess of from about 0 to 30 percent has been found essential to provide the polymers having the desired properties. Amounts less than 0 percent stoichiometric excess yield polymers having undesirable low molecular weight and correspondingly, amounts in excess of 30 percent provide polymers having molecular weights above 125,000 which polymers are difficult to process. By stoichiometric is meant one equivalent of base per chlorine atom. The desirability of the polyethersulfone product is directly related to a combination of properties including density, molecular weight, hardness, glass transition temperature, solvent resistance, flexural and tensile strength. While properties such as low density, high glass transition temperatures and solvent resistance characterize all the polymers of the present invention, higher molecular weight polymers tend to show an increase in the toughness. Optimum flexural and tensile properties will be found in polymers having from 30,000 to 80,000 molecular weight.

Polymerization reaction times may vary and will be dependent on the molecular weight desired. For example to produce a polymer with low molecular weight (e.g. 20,000) it is suggested to allow the reaction to proceed for about 2 hours at 130°–150° and for about 4–5 hours at 150°–170°. Higher molecular weight polymer will require longer reaction times generally from 24 to 48 hours at 130°–150° C. followed by further polymerization on at 150°–170° C. Shorter times at higher temperature are possible but are not recommended in view of possible deleterious results such as polymer deterioration and undesirable color formation. Lower temperatures such as 100°–125° C. may slow the rate of reaction considerably. Preferred temperature ranges are from 140°–160° C. with reaction times of between 4 to 100 hours. Another consideration affecting the temperature of the reaction is the boiling point of the solvent. For obvious reasons the temperature of the reaction should never substantially exceed the boiling point at atmospheric pressure. The polymerization is desirably allowed to proceed at two temperature stages to facilitate the removal of any azeotrope that may be present during the reaction. For example, the azeotrope containing water may be distilled in the lower temperature stage to remove the water after which the solvent may be reused. To avoid oxidative side reactions, the polymerization is expediently carried out in an inert atmosphere, for example under nitrogen. The reaction is preferably carried out under conditions to remove any substantial amount of water formed.

The polymerization reaction requires the presence of a dipolar aprotic reaction solvent. Specific solvents found useful in the process of the invention include dimethylacetamide, hexamethylphosphoramide, sulfolane, dimethylsulfoxide and tetramethylurea. A particularly preferred solvent is dimethylacetamide. Sufficient solvent should be used to enable adequate stirring of the reaction mixture during the polymerization process particularly as the reaction mixture becomes more viscous. Usually a ratio of 5–8 parts of solvent for one part of the biphenyl and the 4,4'-dihalodiphenyl sulfone mixture will be adequate. More solvent should be used for the formation of higher molecular weight polymers.

The polymerization reaction tends to produce water. When water is produced in quantities exceeding 0.5 to 1 percent by weight of the reaction mixture, it is advisable to remove this water, preferably by the distillation of a water-containing azeotrope present in the system. While a variety of inert azeotrope-forming organic liquids such as benzene, xylene and chlorobenzene may be utilized for this purpose, a preferred azeotroper is toluene. In general, the amount of azeotroper required is determined by the amount of water released during the reaction. Amounts of 25 to 33 percent by weight of the amount of solvent medium are expected to be adequate to keep the system sufficiently anhydrous.

If desired, polyethersulfone polymers may be prepared using a blend of starting biphenol monomers. For example polymers may be prepared from a blend of tetraalkylbiphenol with bisphenol A or thiodiphenol. The polyethersulfones prepared from such a blend tend to have lower glass transition temperatures and higher densities.

The polymer resulting from the process of this invention can be isolated, recovered and, if desired, purified according to conventional techniques. For example, solid polymer may be isolated by high-speed mixing of the polymer solution (prior filtration of the polymer solution is optional with excess water or an organic nonsolvent, such as methanol or acetone. Filtration, thorough washing of the filter cake with water, and vacuum drying will yield substantially salt-free polymer. Methanol and acetone are also useful washing reagents for the removal of colored and low molecular weight impurities. Due to their high volatility, their use will also facilitate drying of the solid polymers. Reprecipitation techniques may include the use of, in addition to the reaction solvents, selected polymer solvents, such as dimethylacetamide, chloroform or pyridine, in combination with nonsolvents, such as water, methanol or acetone. A particularly preferred purification technique involves spontaneous reprecipitation from cyclic ethers with near-quantitative yields of purified amorphous polymer. Polymers subjected to this purification technique show after compression molding not only increased tensile and flex strength but exhibit increased thermal stability and a narrowing of the molecular weight range.

Cyclic ethers which are suitable for spontaneous reprecipitation include, dioxane, tetrahydrofuran, 2-methyltetrahydrofuran, tetrahydropyran, epichlorohydrin, 1,3-dioxolane, 1,2-epoxypropane and 4,4'-dimethyl-m-dioxane.

Thermal stability of the polymer may be improved alternatively or in addition to spontaneous reprecipitation by an additive such as for example tris(nonylphenyl) phosphite or by extraction and subsequent reprecipitation. Measurement of thermal effects by differential scanning calorimetry (DSC) and visual inspection of compression molded polymers indicated that thermal stability may be improved by 25° C.

The following examples are included to further illustrate the nature of the invention. In the examples all percentages are by weight unless otherwise indicated. Densities have been calculated by the air displacement method using a Beckman Air Compression Pycnometer, Model 930. Glass transition values (Tg) were obtained by analyzing a sample in the "990 Differential Scanning Thermal Analyzer" available from Du Pont Instruments. Analysis was performed in a nitrogen atmosphere using a standard heating rate of 10° C./min.

EXAMPLE I (Stoichiometric Amount of $K_2CO_3$)

Into a three neck reaction flask equipped with a 1 foot Vigreux column, having attached thereto a Dean-Stark water separator and vertical condenser was placed 6.05 gm. (0.025 m) tetramethylbiphenol, 100 ml. dimethylacetamide, 7.18 g. (0.025 m) of 4,4'-dichlorophenylsulfone, 3.45 g. (0.025 m) of potassium carbonate, and 30 ml. of toluene. The charge was heated while in a nitrogen atmosphere at 138°–145° C. for 64 hours while toluene was refluxed at 105°–133° C. and the water of reaction was collected. Toluene was then allowed to distill at pot temperatures of 150°–165° C. for 3.5 hours. After cooling, the product was precipitated with water (1.6 liters) in a blender. The product was filtered and washed with water until substantially free of Cl⁻. The product was an off-white spongy solid with low bulk density.

TABLE I

| EXAMPLES | 1 | 2 | 3 | 4 | 5 | 6 | 7 | Comparative 8 |
|---|---|---|---|---|---|---|---|---|
| $K_2CO_3$ (%stoichiometric excess) | 0 | 5 | 10 | 15 | 20 | 26 | 26 | NaOH |
| Solvent Wash-$H_2O$ | yes | yes | yes | yes | yes | yes | yes | yes |
| metnanol | — | — | — | — | — | yes | yes | yes |
| acetone | — | yes | yes | yes | yes | — | — | — |
| Reprecipition | | | | | | | | |
| Pyridine /$H_2O$ | — | — | — | — | yes | — | — | — |
| chloroform/ methanol | — | — | — | — | — | yes | — | — |
| yield (%) | 100 | 97 | 94 | 92 | 88 | 82 | 92 | 99 |
| MW | 25,000 | 46,000 | 62,000 | 75,000 | 85,000 | 90,000 | 90,000 | 42,000 |
| Reduced Viscosity (R.V.) (0.2gm polymer in 100 ml. $CHCl_3$) | 0.425 | 0.617 | 0.824 | 0.88 | 0.95 | 1.08 | 1.02 | 0.44 |
| Tg. (° C.) | 250° | 273° | 270° | 275° | 270° | 265° | 275° | 255° |

EXAMPLES 2–7

Examples 2-7 prepared according to the procedure of Example I with varying amounts of $K_2CO_3$ show the properties outlined in Table I. Certain of the examples as seen in Table I have additionally been washed with methanol of acetone. In those examples one part of product was washed with 10 parts of either methanol or acetone per 1 part polymer. Example 5 was reprecipitated from 5% pyridine solution by adding 10 parts of water. Example 6 was reprecipitated from a 5% solution of polymer in chloroform by adding 3 parts methanol. Both the additional washing and reprecipitation techniques will improve the purity of the polymer by removing low molecular weight and coloured byproducts.

Example 8 is a comparative example using NaOH instead of $K_2CO_3$.

COMPARATIVE EXAMPLE 8

(Prior Art Process)

24.22 g. (0.1 m) of TMBP was dissolved in a mixture of 40 g (44.5 ml) dimethylsulfoxide (DMSO) and 140 g (127 ml) chlorobenzene in a 4-neck 500 ml. flask, fitted with paddle stirrer, thermometer, $N_2$ sparge, dropping funnel and fractionating column which column was connected to a water separator and condenser. The clear amber solution was heated under a nitrogen atmosphere at 63°-83° C. while 17.5 g of a 46.5% NaOH solution (0.20 equivalents) was added over a 7 minute period. The resulting thin slurry was heated at 114°-134° and water removed azeotropically (1 hr.). Additional DMSO (44.5 ml.) was added while chlorobenzene was distilled at 134°-160° (1 hr.). A slurry was obtained. A heated solution of 28.72 g. (0.1 m) 4,4'-dichlorophenylsulfone in chlorobenzene (30%) was added to the slurry at 155°-158° over a 15 minutes period. A further amount of DMSO (44.3 ml) was added while the precipitated solids dissolved. The final stage of reaction was carried out at 156°-160° for 4.5 hours during which the viscosity built up. The product was cooled and treated with 2 ml. methyl iodide at 125° for 10 minutes to methylate residual phenolic hydroxyl groups. Upon cooling the product was obtained as a moist solid. It was mixed well with 1500 ml $H_2O$, filtered, and washed with water until chloride ion free. The moist filter cake was then transferred into 1 liter of methanol, stirred well and filtered. The product was washed with methanol, air-dried and then vacuum dried at 120° C. and 1 mm Hg pressure for 3 hours. The yield of polymer, was 45.3 g. (99.3%).

TABLE II

| EXAMPLE | 1 | 2 | 3 | 6 | 7 | Comparative 8 |
|---|---|---|---|---|---|---|
| Density (g/cc.) | 1.16 | 1.19 | 1.18 | 1.18 | 1.20 | 1.22 |
| Tensile¹ strength (psi.) | — | 12,000 | 11,600 | — | 11,000 | — |
| Flexural² strength (psi.) | — | 17,500 | 14,000 | — | — | — |
| Hardness³ (Barcol) | 18-23 | 15-20 | 12 | 14-22 | 25-28 | — |

¹Tensile strength was determined in accordance with ASTM D-638
²Flexural strength was determined in accordance with ASTM D-790
³Barcol Hardness was determined in accordance with ASTM D-2583

TABLE III

Comparisons of Dioxane-Treated and Untreated Polymer

| | Example 3 Untreated | Example 10 Dioxane-treated |
|---|---|---|
| Mn | 15,800 | 25,900 |
| Mw | 62,200 | 63,800 |
| Mw/Mn | 3.94 | 2.47 |
| RV ($CHCl_3$) | 0.824 | 0.872 |
| Tg (° C.) | 270 | 275 |

TABLE III-continued

Comparisons of Dioxane-Treated and Untreated Polymer

|  | Example 3 Untreated | Example 10 Dioxane-treated |
|---|---|---|
| Cl (%) | 0.38 | 0.14 |
| Compression Molding: | | |
| Tensile Str. (psi) | 11,600 | 12,400 |
| Modulus ($10^6$ psi) | 0.35 | 0.30 |
| Flex Str. (psi) | 14,000 | 21,000 |
| Modulus ($10^6$ psi) | 0.39 | 0.40 |
| Elongation (%) | 5.85 | 4.0 |
| Clarity | fair | very good |
| Color | amber | light amber |

Several polyethersulfone polymers were compression molded in the form of 3″ diam. discs, using a 50 ton press (Pasadena Hydraulics, Inc.) Electrically heated platens were used with the top platens having a temperature of 600° F. and the bottom platen a temperature of 570°–590° C. The weight of each polysulfone polymer sample was 10 g. The mold release agent was Fluoroglide, available from Chemplast Company. The samples were heated for 10 minutes at 600° F. at zero pressure followed by 10 minutes at 600° F. and 7,000 psi. The molded parts were removed at 185° F.

The properties of the molded parts prepared by the above procedure are shown in Table II.

The polymers of the present invention are also useful in the manufacture of films and extruded sheets. Standard solvent casting and extrusion techniques such as described in the *Encyclopedia of Polymer Science and Technology*, Interscience Publishers, Vol. 6, pages 764–777 may be employed.

The following example 9 illustrates a method to solventcast a film.

Examples 10, 11 and 12 illustrate three techniques to improve thermal stability. Other improved properties are shown in Table III.

EXAMPLE 9

1.6 g. of polymer prepared according to the method of Example 2 was dissolved in 64 ml. of pyridine and filtered. The clarified solution was cast on a glass plate within a Teflon frame in a dry and dust free atmosphere. A clear film of 1.5 mils thickness was obtained after 24 hours at a temperature of 65° C. The film was tested and showed a tensile strength of 8900 psi., a modulus of $0.33 \times 10^6$ psi. and an elongation of 4.5%.

EXAMPLE 10

Purification by Dioxane (spontaneous reprecipitation)

A sample of TMBP polyethersulfone (50 g) which has been prepared according to Example 3 and which has been purified by a solvent treatment step with acetone at room temperature is mixed with 930 ml dioxane and stirred for 20 minutes. After 20 minutes when most of the polymer has dissolved, the solution is filtered through Whatman No. 4 filter paper and a layer of Super Cel filter aid. The filtration is completed within 20–30 minutes. The filter cake is washed with 250 ml dioxane. The combined filtrate is then stirred gently for 24 hours at room temperature. During this time spontaneous re-precipitation of purified polymer occurs. The product is filtered, washed with 300 ml dioxane and 500 ml methanol, and is then dried at 65°/16 hours at atmospheric pressure and at 80°/<1 mm for 68 hours. The product is recovered in 72% yield as a light yellow powder. Properties of the untreated and dioxane-treated product (as amorphous powder and compression-molded specimen) are given in the attached Table III.

EXAMPLE 11

Tris(nonylphenyl)phosphite Additive

A sample of 15 g TMBP polysulfone with R.V.=0.69, acetone-washed and prepared as in Example 2 of the invention, was mixed with 150 ml acetone, containing 0.15 g tris(nonylphenyl) phosphite. The slurry is stirred and the solvent is gradually allowed to evaporate at room temperature. The product is then dried at 75°/<1 mm for 2–5 hours. A compression molding of this polymer was made at a temperature 25° C. higher than a control without additive. No thermal deterioration is noted in the treated sample. Some deterioration is seen at the edge of the control sample. DSC showed a 25° higher onset of thermal effects in the treated sample versus control.

EXAMPLE 12

Extraction Followed by Reprecipitation of Polymer 14.5 g of a sample of acetone-washed polyethersulfone prepared according to Example 2 was dissolved in 300 ml chloroform. The solution was extracted three times with 50 ml 0.23 N $H_2SO_4$, followed by six extractions with 75 ml water. The chloroform solution was then filtered through a layer of filter aid. Polymer was precipitated by adding one part of the chloroform solution to two parts of rapidly stirred methanol. The polymer precipitates as a white solid and is filtered and washed with methanol and acetone. The polymer is dried at 95°/<1 mm for 4 hours. The product has excellent color. A compression molding of this polymer made at a temperature 25° C. higher than a control had better color and showed no thermal deterioration. The control sample showed some deterioration at the edges. DSC analysis showed a 25° higher onset of thermal effects in the treated sample versus control.

What is claimed is:

1. A process to prepare polyethersulfone polymers having a molecular weight from between 20,000 to 125,000 which comprises reacting substantially equimolar amount of a 3,3′,5,5′-tetraalkyl-4,4′-dihydroxybiphenyl and a dihalodiphenylsulfone compound in the presence of a dipolaraprotic solvent and from about 1 to 1.33 moles of an alkali metal carbonate or bicarbonate per mole of dihydroxybiphenyl.

2. A process as claimed in claim 1 wherein the dihalodiphenylsulfone is 4,4′dichlorodiphenylsulfone.

3. A process as claimed in claim 1 wherein the biphenol is 3,3′5,5′-tetramethyl-4,4′-dihydroxybiphenyl.

4. A process as claimed in claim 1 wherein the alkali metal carbonate is potassium carbonate.

5. A process as claimed in claim 4 wherein the amount of potassium carbonate is from 1.05 to 1.26 moles of alkali metal carbonate or bicarbonate per mole of dihydroxybiphenyl.

6. A process as claimed in claim 4 wherein the amount of potassium carbonate is from about 1.1 to 1.20 moles of alkali metal carbonate or bicarbonate per mole of dihydroxybiphenyl.

7. A process as claimed in claim 1 wherein the dipolar aprotic solvent is selected from the class consisting of dimethylacetamide, hexamethylphosphoramide, sulfolane, tetramethylurea and diphenylsulfone.

8. A process as claimed in claim 7 wherein the solvent is dimethylacetamide.

9. A process as claimed in claim 1 which comprises reacting a substantially equimolar amount of a 3,3',5,5'-tetramethyl-4,4'-dihydroxybiphenyl and 4,4'-dichlorodiphenylsulfone in the presence of dimethylacetamide as a solvent and from about 0–30 percent stoichiometric excess of potassium carbonate.

10. A polyethersulfone polymer prepared by the method of claim 1 derived from 3,3',5,5'-tetraalkyl-4,4'-dihydroxybiphenyl said polymer having a molecular weight of 20,000 to 125,000 and a density of no more than 1.20 gm/cc.

11. A polymer as claimed in claim 10 wherein the biphenol is 3,3',5,5'-tetramethyl-4,4'-dihydroxybiphenyl.

12. A shaped article containing a polymer as claimed in claim 10.

13. An article as claimed in claim 12 which is a film.

14. A polymer as claimed in claim 10 which has been purified by spontaneous reprecipitation from a cyclic ether.

15. A polymer as claimed in claim 14 wherein the cyclic ether is dioxane.

16. A shaped article as claimed in claim 12 having a flexural strength of from about 14,000 to 21,000 psi.

17. A shaped article as claimed in claim 12 having a tensile strength of about 8900 psi.

18. A shaped article as claimed in claim 12 having a tensile strength of from about 8900 to about 12,400 psi.

19. An article as claimed in claim 12 which is a molded part.

20. A process to prepare polyethersulfone polymers having a molecular weight from between about 20,000 to about 125,000 and a minimum glass transition temperature of 250° C. which polymers are useful in the manufacture of shaped articles having a density of no more than 1.20 gm/cc which comprises reacting substantially equimolar amount of a 3,3',5,5'-tetraalkyl-4,4,'-dihydroxybiphenyl and a dihalodiphenylsulfone compound in the presence of a dipolar aprotic solvent and from about 1–1.33 moles of an alkali metal carbonate or bicarbonate per mole of dihydroxybiphenyl.

21. A process as claimed in claim 20 which further comprises the step of purifying the polymers by the spontaneous reprecipitation from a cyclic ether.

22. A process as claimed in claim 21 wherein the cyclic ether is a dioxane.

* * * * *

UNITED STATES PATENT AND TRADEMARK OFFICE
CERTIFICATE OF CORRECTION

PATENT NO. : 4,156,068

DATED : May 22, 1979

INVENTOR(S) : Ludwig A. Hartmann

It is certified that error appears in the above-identified patent and that said Letters Patent are hereby corrected as shown below:

Column 5, line 61, "of 40 g" should read --of 49 g --.

Column 6, line 29 "DMSO (44.3 ml)" should read --DMSO (44.5 ml)--

Signed and Sealed this

Fifth Day of August 1980

[SEAL]

Attest:

SIDNEY A. DIAMOND

Attesting Officer

Commissioner of Patents and Trademarks